Dec. 30, 1947.  R. W. DINZL  2,433,654
INJECTION MOLDING MACHINE
Filed May 4, 1944    8 Sheets-Sheet 4
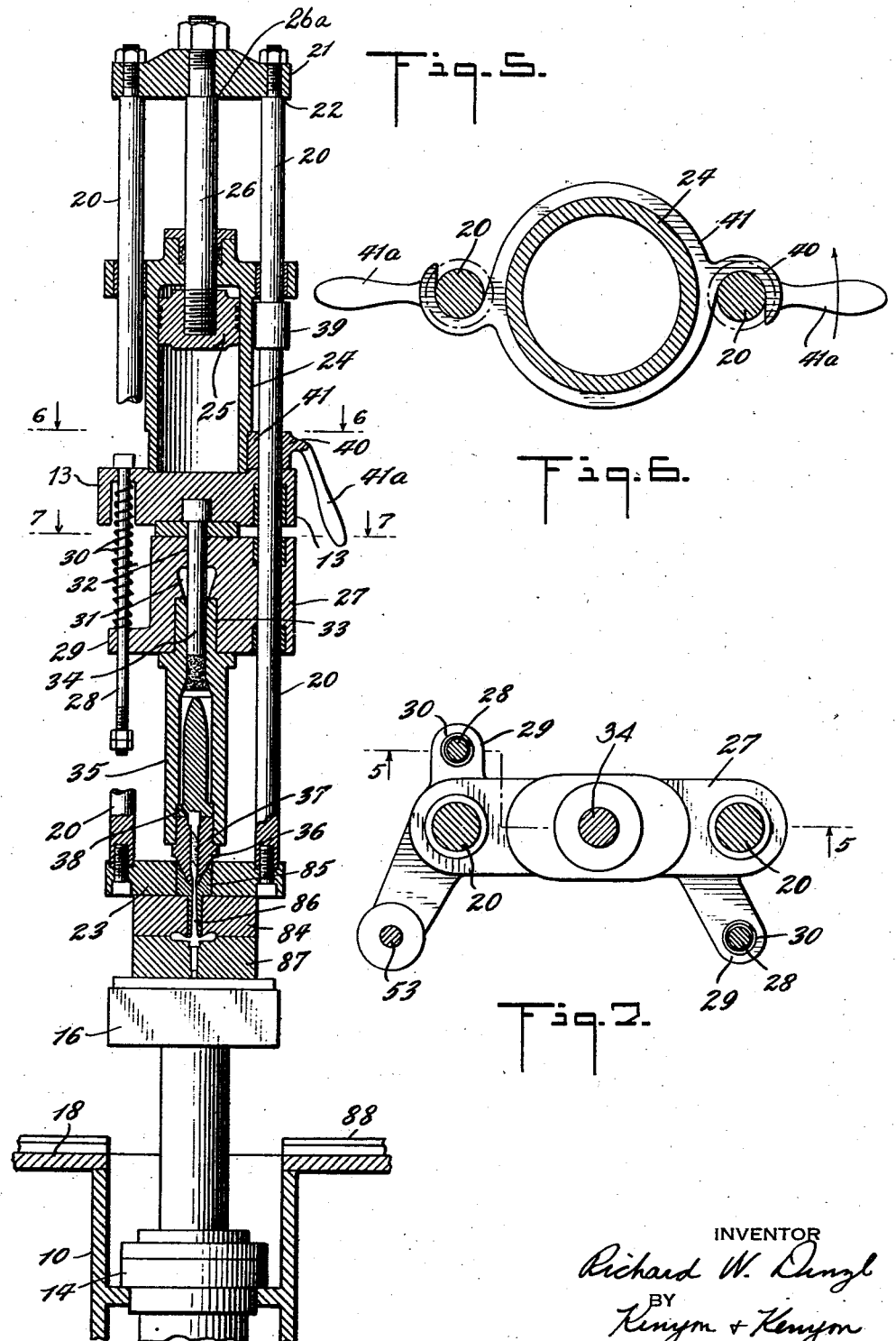
INVENTOR
Richard W. Dinzl
BY
Kenyon & Kenyon
ATTORNEYS

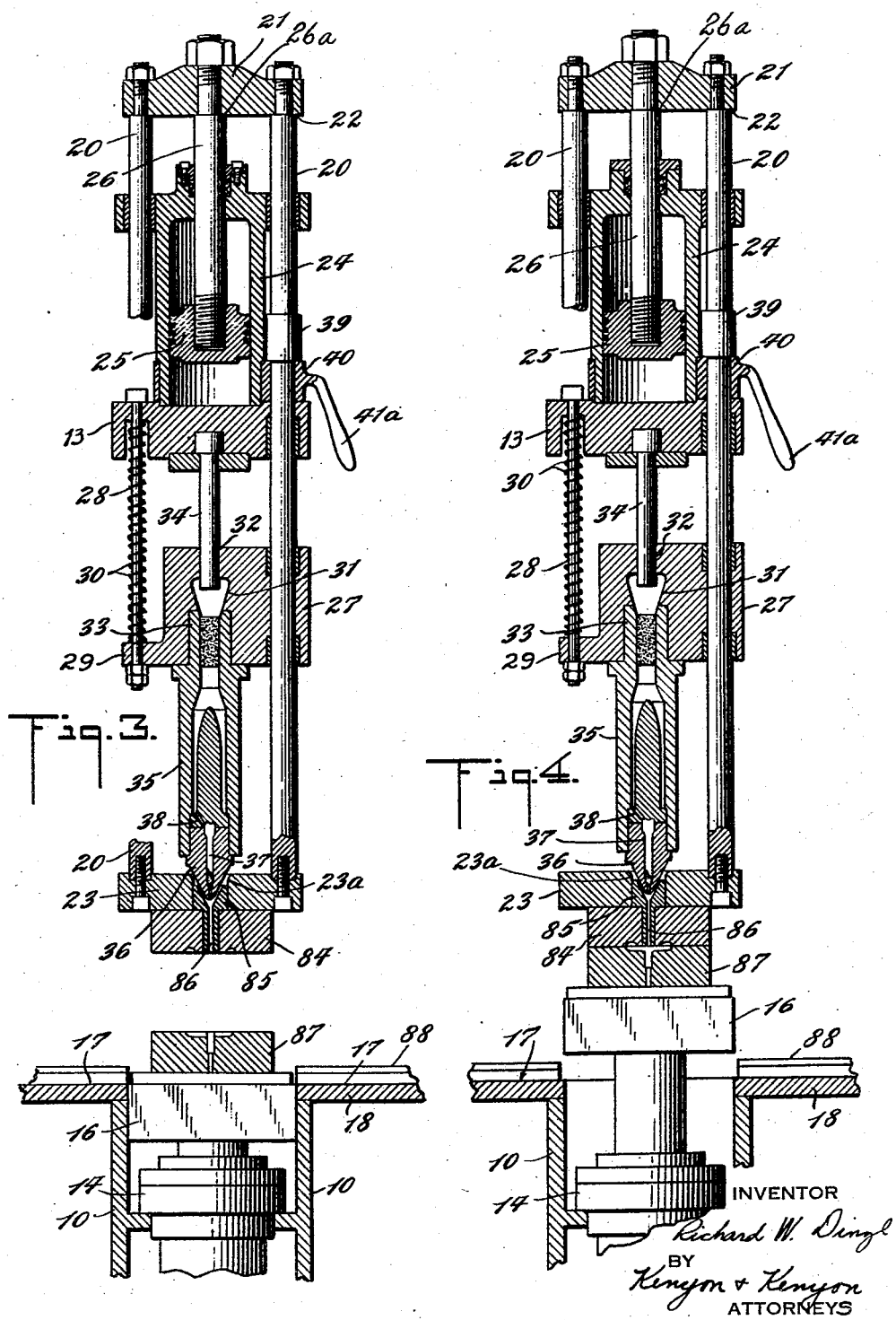

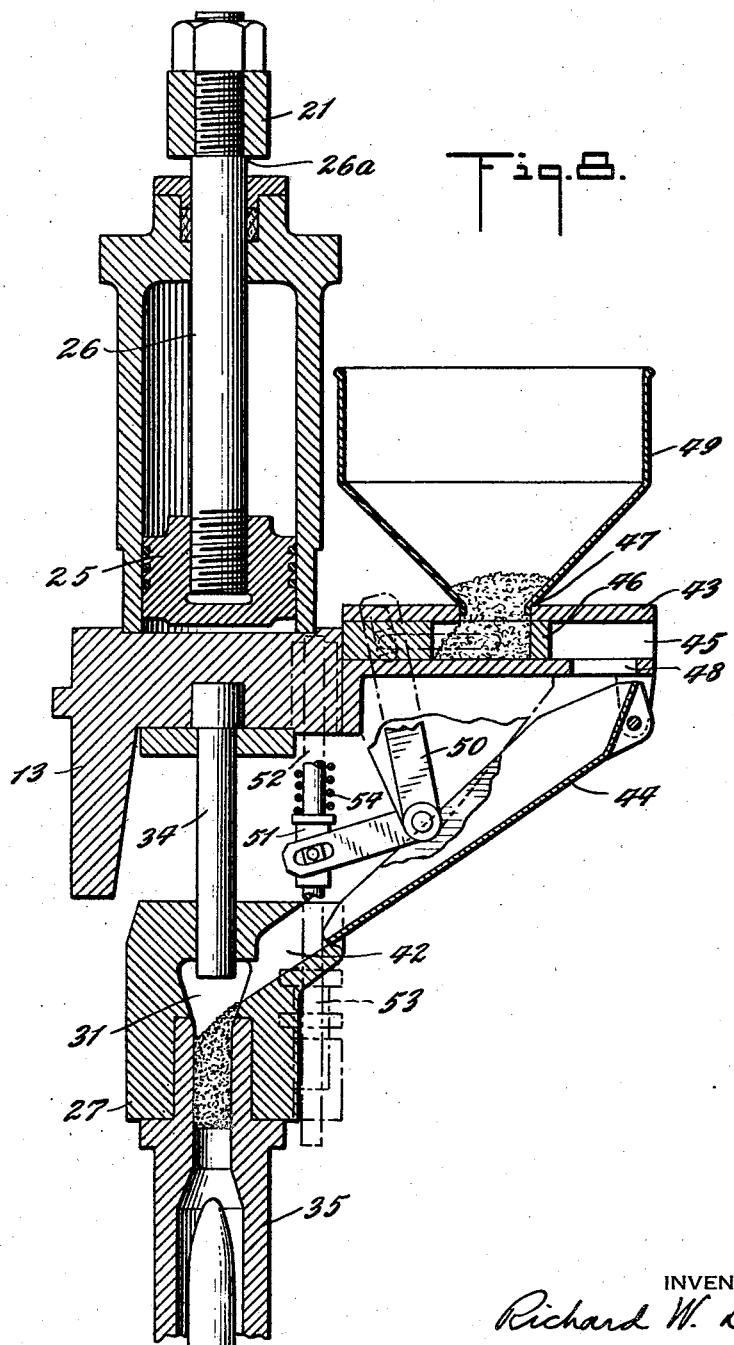

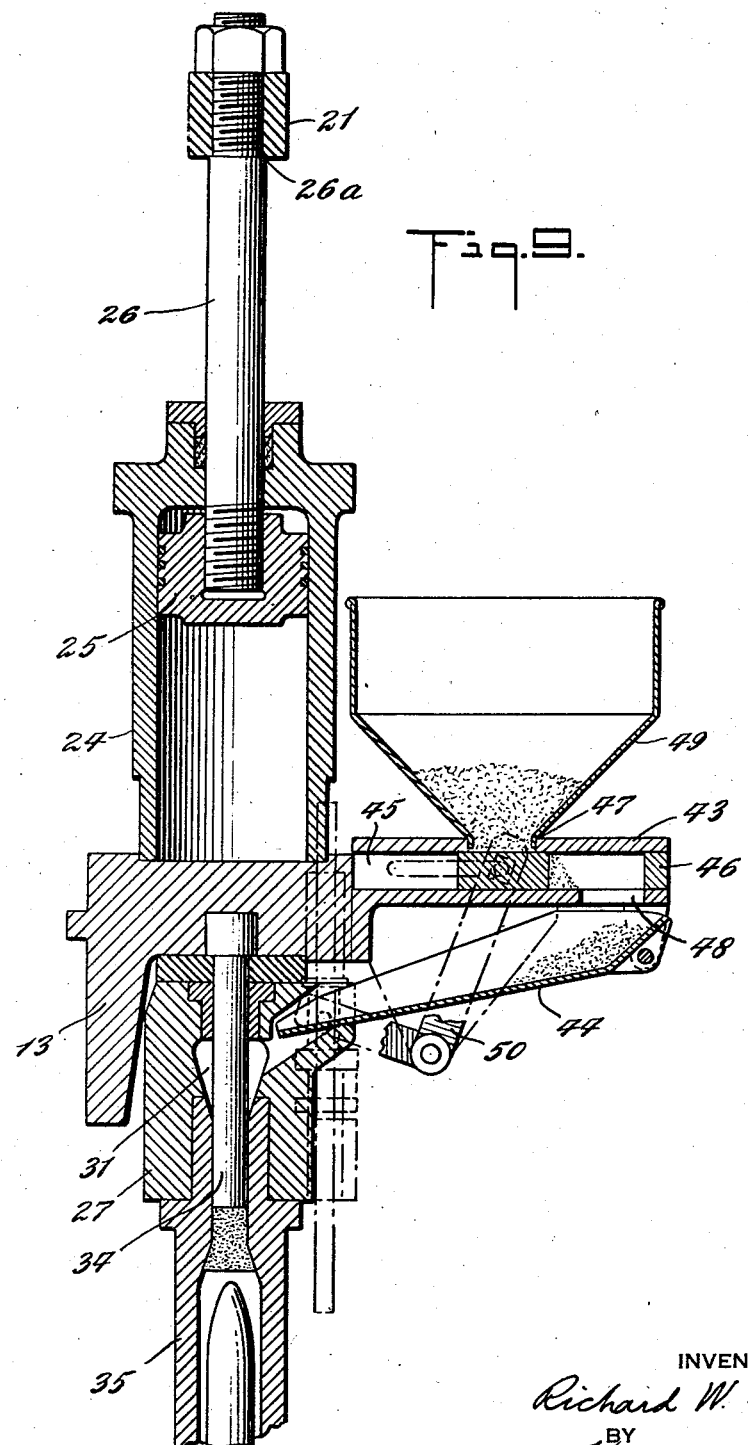

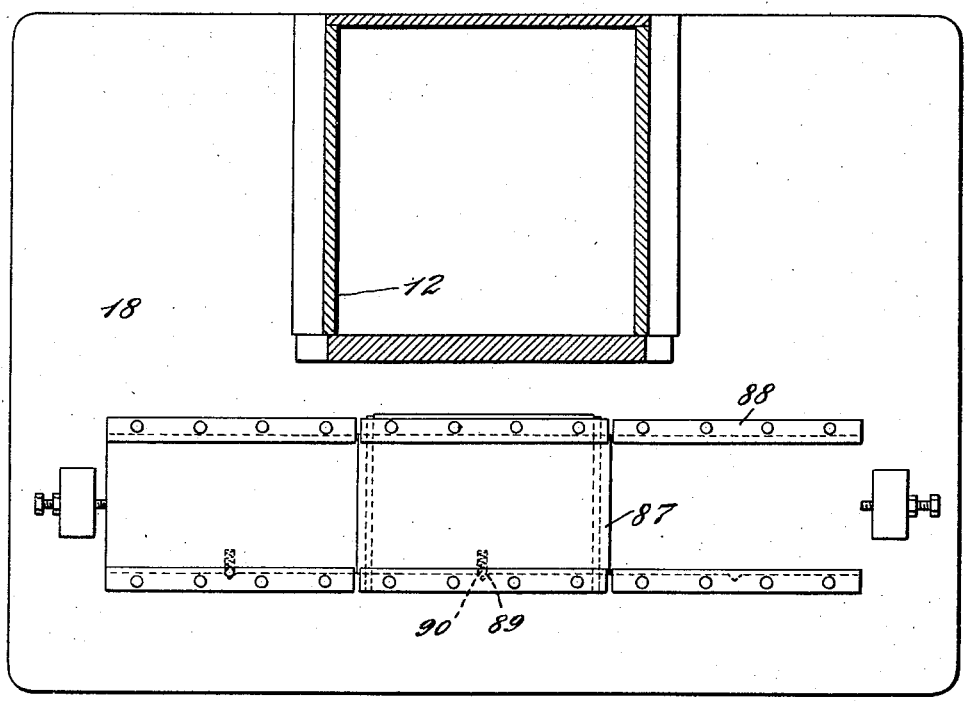
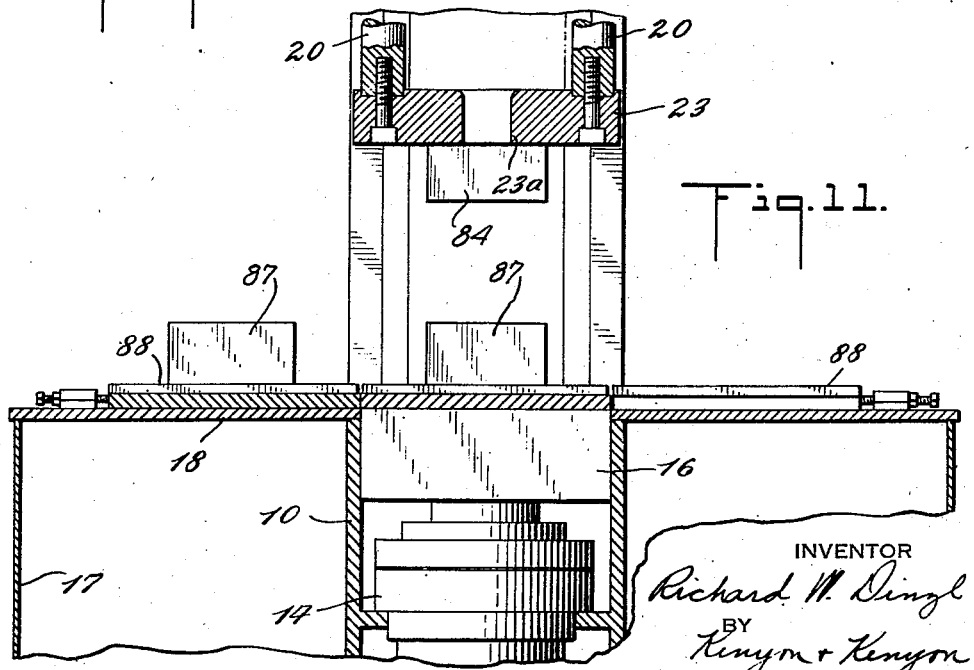

Patented Dec. 30, 1947

2,433,654

UNITED STATES PATENT OFFICE 2,433,654

INJECTION MOLDING MACHINE

Richard W. Dinzl, Westfield, N. J., assignor to The Watson-Stillman Co., Roselle, N. J., a corporation of New Jersey Application May 4, 1944, Serial No. 534,038

16 Claims. (Cl. 18—30)

This invention relates to injection molding machines.

An object of this invention is an injection molding machine having a stationary plunger and a cooperating reciprocable injection cylinder, movement of which relative to the plunger is effected by a hydraulic ram operating through a pair of separable mold members whereby the mold is retained in engagement with the injection cylinder nozzle and closing pressure is applied to the mold members.

A further object of this invention is an injection molding machine in accordance with the foregoing object having provision for changing the pressure applied to the molding material in the injection cylinder without changing the mold clamping pressure.

A still further object of this invention is an injection molding machine in which the mold comprises a pair of separable members, one of which is removable from the machine whereby a molded article is withdrawn from the machine in its molded member and retracted therefrom while another molded member is introduced into the machine and the molding operation is repeated.

An additional object of this invention is an injection molding machine in which reciprocation of the injection cylinder is effective to feed a charge of molding material from a hopper into the injection cylinder.

Other objects, novel features and advantages of this invention will become apparent from the following specification and accompanying drawings, wherein:

Figs. 3, 4 and 5 are fragmentary sections substantially on the line 5—5 of Fig. 7;

Fig. 6 is a section on the line 6—6 of Fig. 5;

Fig. 7 is a section on the line 7—7 of Fig. 5;

Figs. 8 and 9 are fragmentary sections substantially on the line 9—9 of Fig. 2;

Fig. 10 is an enlarged section substantially on the line 10—10 of Fig. 1;

Fig. 11 is an enlarged fragmentary section substantially on the line 11—11 of Fig. 1.

Figure 1:
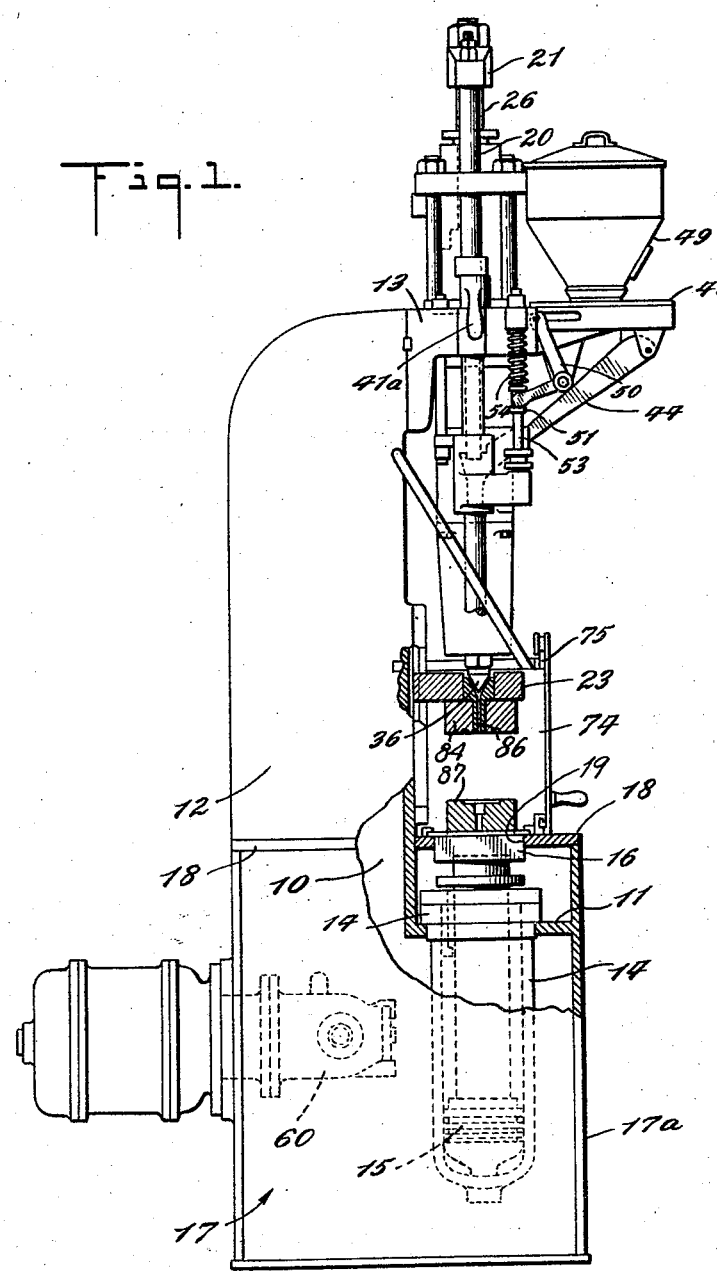
Fig. 1 is a side elevation partly in section of a machine embodying the invention.

A frame 10 has a table portion 11 and a hollow riser 12 at the upper end of which is supported a platform 13 overlying the table portion 11. The table portion 11 supports a vertical cylinder 14 in which is mounted a vertically reciprocable piston 15 at the end of which is provided a head 16 which, together with the piston 15, constitutes a ram. A tank 17 composed of plates 17a attached to the frame 10 surrounds the cylinder 14 and is provided with a top plate 18 having a cutout to receive the riser 12 and an aperture 19 receiving the ram head 16.

As shown in Figs. 1 to 5 inclusive, a pair of vertical rods 20 extend through the platform 13 in which they are slidable and are connected together at their upper ends by a cross-bar 21 resting on shoulders 22 of the rods 20 which extend through the cross-bar. A platen 23 is attached to the lower end of the rods 20 for vertical reciprocation therewith. The platen 23 and the cross-bar 21 are thus tied together for unitary movement. The platen 23 has a central bore 23a, the purpose of which will subsequently become apparent.

A cylinder 24 is supported by the platform 13 and extends upwardly therefrom. In this cylinder is mounted a piston 25 connected by a rod 26 to the cross-bar 21 for unitary movement therewith, the rod 26 having a shoulder 26a engaging the cross-bar. A head 27 is slidably supported by the rods 20 and additional rods 28 supported by the platform 13 pass through apertures in the flanges 29 of the head 27. A coil spring 30 surrounds each rod 28 and opposes movement of the head 27 toward the platform 13.

In the head 27 is provided a chamber 31 from which a bore 32 leads upwardly and a larger diameter bore 33 leads downwardly. A plunger 34 is carried by the platform 13 and projects downwardly into the bore 32 while one end of an injection cylinder 35 is seated in the bore 33, the bore of the injection cylinder 35 being of the same diameter as the bore 32 over a portion of its length. The injection cylinder 35 contains a torpedo of the usual type and carries a nozzle 36 having a central bore 37 which communicates through passageways 38 with the space between the torpedo and the inner wall of the injection cylinder.

Each rod 22 is provided with an enlarged portion 39 between which and the platform 13 is arranged a spacer 40 forming part of a ring 41 rotatably supported by the platform 13 and surrounding the cylinder 24 (Figs. 5 and 6). With the spacer 40 in the position shown, the platen 23 is maintained in close proximity to the nozzle 36 but with the spacer in inoperative position the platen may be moved away from the nozzle a distance equal to the height of the spacer 40. Handles 41a are provided for actuating the ring 41.

A passageway 42 leads upward obliquely from the chamber 31 to the exterior of the head 27 (Figs. 8 and 9). A member 43 extends horizontally from the platform 13 and pivotally supports one end of a chute 44, the remaining end of which projects into the passageway 42. The member 43 has a horizontal chamber 45 in which is arranged a slide 46 having a vertical aperture, the member 43 being provided with an aperture 47 in its top wall and an aperture 48 in its bottom wall, the latter of which apertures communicates with the hinged end of the chute 44. A hopper 49 carried by the member 43 has a discharge opening in register with the aperture 47. The slide 46 is connected to one arm of a bell crank lever 50, the remaining arm of which is connected to a collar 51 carried by a rod 52 slidably mounted in the platform 13 and having its bottom end passing through a vertically adjustable sleeve 53 carried by the head 27. A spring 54 surrounds the rod 42 and opposes upward movement of it.

Reciprocation of the slide 46 from left to right delivers a charge of molding material from the hopper 49 to the chute 44 and such movement of the slide is effected by engagement of the upper end of the sleeve 53 with the lower end of the collar 51 upon upward movement of the head 27. Upon downward movement of the head 27, the slide is returned to its original position by the spring 54. Adjustment of the time of actuation of the slide is effected by adjustment of the post 53.

A pump 60 (Figs. 1 and 12) located within the tank 17 supplies oil from the tank 17 through a conduit 61 to a four-way valve 62 also located in the tank 17. The valve 62 has an inlet 62a, two ports 62b and 62c and an outlet 62d, the arrangement being such that either of the two ports 62b and 62c may be put in communication with the inlet 62a with the other port being in communication with the discharge outlet 62d. A spring 63 normally holds the valve with the inlet 62a in communication with the port 62b and the port 62c in communication with the discharge outlet 62d, while a solenoid 64 is provided for moving the valve to put the port 62c in communication with the inlet 62a and the port 62b in communication with the discharge outlet 62d. The port 62a communicates with the bottom of the cylinder 14 through a conduit 65 and communicates through a conduit 66 with the top of the cylinder 24 which in combination with the piston 23 constitutes a hydraulic dashpot. In the conduit 66 there is provided a restricted orifice 67 and a relief valve 68 having its vent communicating with a conduit 69 leading to the tank 17. The port 62b communicates through a conduit 70 with the top of the cylinder 14 and through a check valve 71 with the conduit 66 between the orifice 67 and the relief valve 68. The cylinder 14 and the piston 15 together constitute a hydraulic motor for operating the ram head 16.

The arrangement of the valve 62 is such that when the solenoid 64 is de-energized, the pump is in communication with the top of the cylinder 14 through the conduit 70 and is in communication with the top of the cylinder 24 through the check valve 71, conduit 66 and relief valve 68 while the bottom of the cylinder 14 is in communication with the hydraulic fluid reservoir through the conduit 65 and port 62d. Upon energization of the solenoid 64, the valve 62 is operated against the action of the spring 63 into a position in which the pump 60 is in communication with the bottom of the cylinder 14 through the conduit 65 and with the cylinder 24 through the conduit 66, restricted orifice 67 and relief valve 68 while the top of the cylinder 14 is in communication with the hydraulic fluid reservoir through the conduit 70 and port 62d.

A safety door 74 is slidably supported by a guide rail 75 and may be arranged either in front of the space between the ram 16 and platen 23 or to either side of such space. A self-opening limit switch 76 is provided for closure by the door 74 when in its middle or closed position. With the limit switch 76 open, the solenoid 64 is de-energized and the spring 63 maintains the valve 62 in the position in which the upper end of the cylinder 14 is in communication with the pump 60 and the lower end of the cylinder is in communication with the outlet of valve 62. The ram 16 is therefore in its lowermost position. Closure of the switch 76 effects energization of the solenoid 64 to effect reversal of the valve setting to cause upward movement of the ram which remains in its up position until the solenoid 64 is de-energized upon opening of the switch 76 by movement of the door 74 to one of its side positions. Upon de-energization of the solenoid 64, the spring 63 returns the valve 62 to its original position to effect downward movement of the ram.

Figure 12:
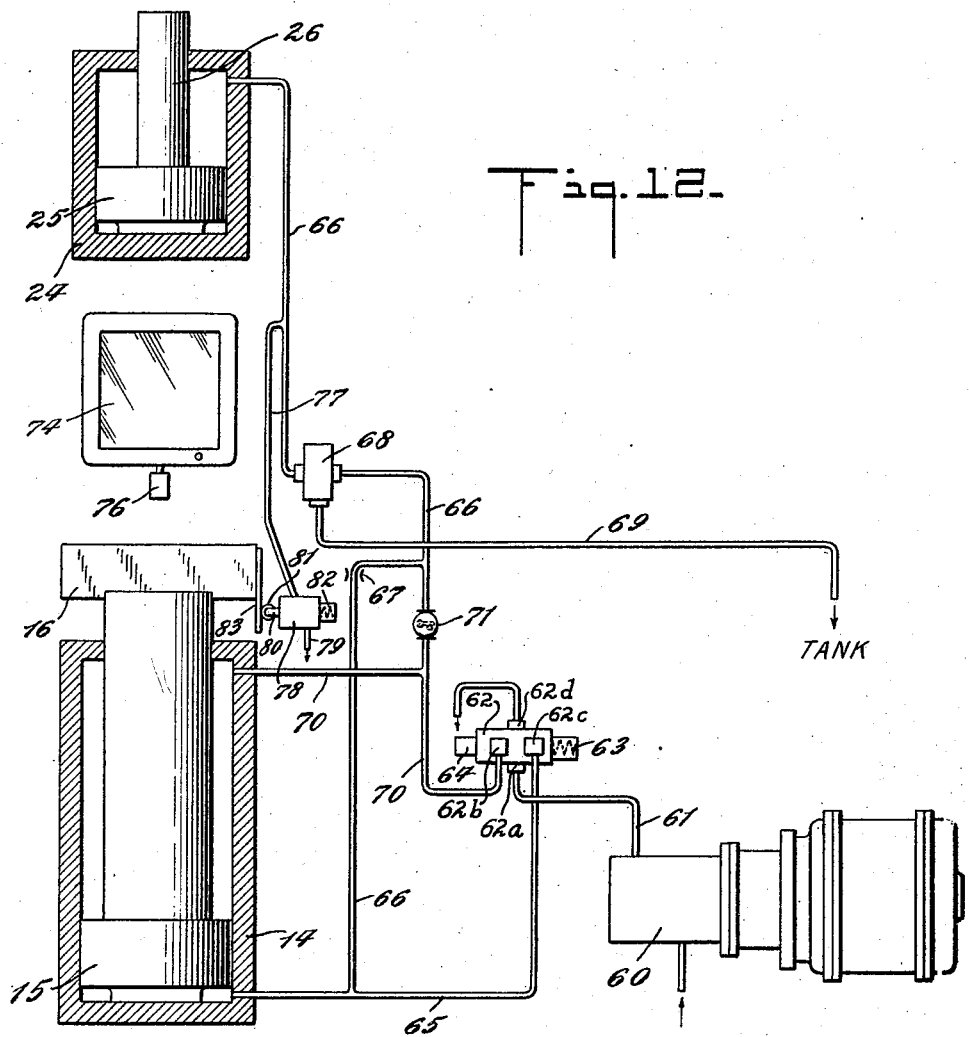
Fig. 12 is a hydraulic circuit diagram.

As shown in Fig. 12, a conduit 77 leads from the conduit 66 between the relief valve 68 and the cylinder 24 to one port of a valve 78, the other port of which communicates with the tank 17 through the conduit 79. The valve 78 is provided with an actuating plunger 80 carrying a roller 81 and a re-setting spring 82. The roller 81 is engageable by a plate 83 carried by the ram 16. When the plate 83 engages the roller 81, the valve 78 is held against the action of the spring 82 in such position as to provide communication between the conduit 77 and the conduit 79 but when the roller 81 is disengaged from the plate 83 the spring 82 moves the valve 78 into a position in which the conduit 77 is out of communication with the conduit 79.

A first or upper die member 84 is attached to the platen 23 for unitary movement therewith and has a boss 85 extending into the platen bore 23a, the boss being provided with a passageway 86 adapted for registration with the bore 37 of the nozzle 36. A pair of second or movable die members 87 are alternately slidable onto and off from the ram 16. The two die members have cooperating recesses forming the mold cavity from which leads the passageway 86. Gibs 88 are provided for guiding the lower die member onto and off from the ram. An impositive detent 89 is provided on each lower die member 87 for cooperation with a notch 90 properly to locate the die member on the ram 16.

Figure 2:
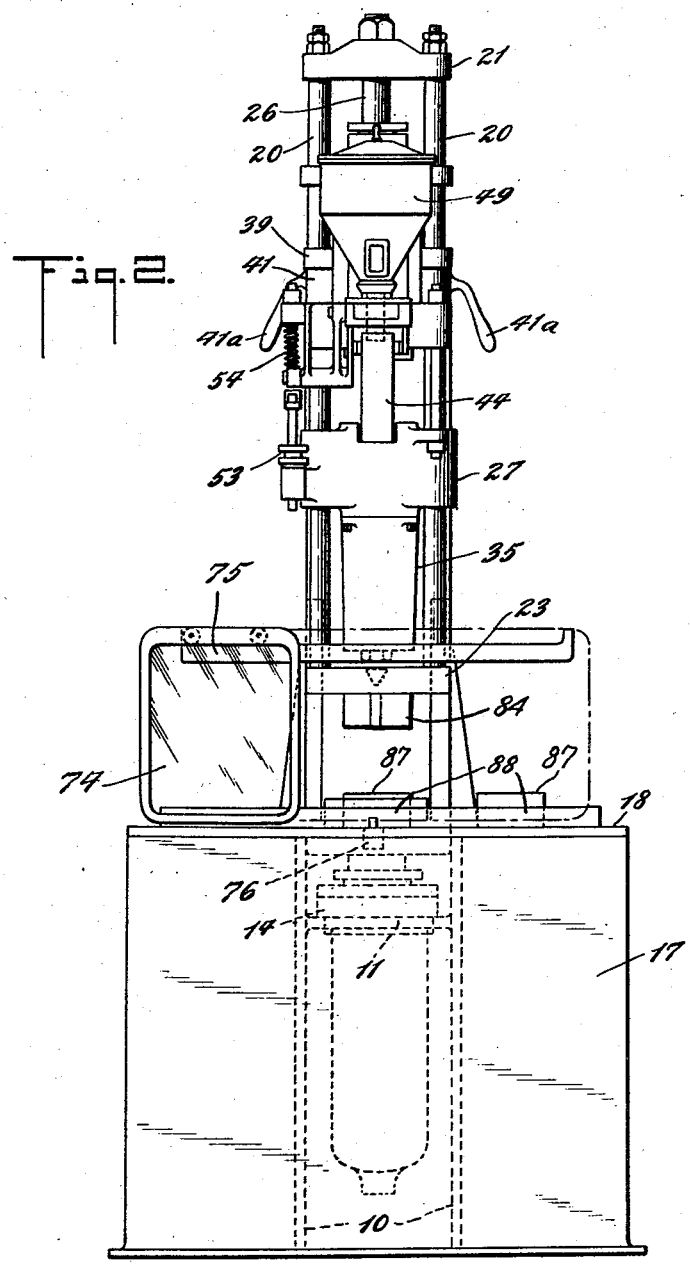
Fig. 2 is a front elevation thereof.

In Figs. 1 and 2, the machine is shown with the ram 16 in its down position and with the die members open. In this position of the machine, the door 74 is arranged to the left of the ram head 16 and the switch 76 is opened so that the solenoid 64 is de-energized. Also, the head 27, together with the piston 25 is in its down position. Furthermore, the chute 44 and the slide 46 are in the position shown in Fig. 8. The platen 23 is so arranged that the nozzle 36 is just out of engagement with the boss 85 as shown in Fig. 3. The above-described position of the parts is that assumed by them at the end of the molding cycle and the die member 87 on the head 16 contains the article formed in the molding cycle just completed while a second and empty die member 87 is arranged on the plate 17 at the right of the ram head 16. The valve 62 is so set that oil is supplied through the conduit 70 to the upper end of the cylinder 14 and also flows through the check valve 71, conduit 66, conduit 77, stop valve 78 to the reservoir 17, the stop valve 78 being held in open condition by engagement of the plate 83 with the roller 81. The pump delivery, therefore, discharges back to the reservoir while the ram is in its lowermost or rest position.

In order to condition the machine for further operation, the second die member 87 is slid onto the ram head 16 to push the first die member 87 in back of the door 74, the second die member being properly located on the ram head 16 by engagement of the detent 89 in the notch 90. The door 74 is now moved into its middle position with concomitant closing of the switch 76.

Closing of the switch 76 energizes the solenoid 64, whereupon the valve 62 is actuated to cause oil to flow into the bottom of the cylinder 14 and through the conduit 66, restricted orifice 67, conduit 77, stop valve 78 and conduit 69 to the reservoir 17 until the ram 15 has risen sufficiently to disengage the plate 83 from the roller 80 to effect closing of the stop valve 78. Pressure for lifting the ram is provided by the restricted orifice 67 and by-pass of oil to the conduit 70 is prevented by the check valve 71. Upon closure of the valve 78, oil is supplied to the cylinder 24 under pressure limited by the setting of the relief valve 68.

The supply of oil to the bottom of the cylinder 14 moves the ram 16 upwardly first to bring the two dies into engagement as shown in Fig. 4, then to move the platen 23 into engagement with the nozzle 36 as shown in Fig. 4, and then to move the head 27 upwardly. Upward movement is communicated to the piston 25 through the rods 20, crossbar 21 and rod 26. Initial upward movement of the assembly is unopposed until the valve 78 is closed. Thereafter, the pressure of the oil in the cylinder 24 above the piston 25 builds up to the pressure at which the relief valve 68 is set and remains at such pressure during the remainder of the upward travel of the piston 23.

As the head 27 moves upwardly, the plunger 34 is caused to move through the chamber 31 and enter the upper portion of the injection cylinder 35 to cause movement of molding material in the chamber 31 and in the cylinder 35 toward the nozzle 36 and consequent discharge of plasticized molding material through the nozzle into the die cavity. Upward movement of the platen 23 is opposed by the pressure developed in the cylinder 24 plus pressure required to move molding material in cylinder 35 into the die cavity and the dies are clamped together by a pressure equal to the upward pressure exerted by the ram 16. By variation of the setting of the relief valve 68, the pressure exerted on the molding material to force it into the mold may be changed without changing the clamping pressure of the lower die 87 against the upper die 84.

Upward movement of the head 27 causes clockwise rotation of the bell crank lever 49 as well as clockwise rotation of the chute 44 into the position shown in Fig. 9. The rotation of the bell crank lever 50 causes rightward movement of the slide 46 to deliver a charge of the molding material to the chute 44.

The dies are held in their upper position until completion of the molding operation and during the period of the molding operation, the molded article is removed from the first lower die member 87 now resting on the plate 17 at the left of the ram. Removal of the article is effected by means, not shown, and constituting no part of the present invention. The first lower die member is thus conditioned for use again.

After having effected ejection of the molded article from the first lower die member 87 and the current molding operation having been completed, the operator moves the safety door 74 to the right of the ram head 16. Thereupon, the solenoid 64 is de-energized and the valve 62 reset to its original condition by the spring 63. Consequently, oil flows from the pump through the conduit 70 to the top of the cylinder 14 to force the ram downwardly and oil flows from the bottom of the cylinder 14 through the conduit 65 and outlet 62d to the tank. Oil also is supplied to the cylinder 24 through the check valve 71 and relief valve 68 until the valve 78 is re-opened by downward movement of the ram 16. The restricted orifice 67 prevents appreciable by-pass of oil from the conduit 70 through the conduit 65 while the valve 78 is closed thereby insuring sufficient pressure in the conduit 70. The head 27 moves downwardly to disengage the plunger 34 from the injection cylinder and effects counter-clockwise rotation of the bell crank lever 50 on the chute 44. The slide 46 is thereupon returned to its original position and the charge of molding material is delivered by the chute into the chamber 31 above the injection cylinder.

After the ram head 16 reaches its original position, the first die member 87 is slid again onto the ram head 16 to discharge the second lower die member 87 from the ram head and the first die member 87 is properly located on the ram head 16 by engagement of its detent 89 in the notch 90. The door 74 is again returned to its intermediate position and the molding cycle is repeated.

In the event that it is necessary to remove a sprue from the upper die, the ring 41 is rotated to disengage the spacers 40 from the rod portions 39 permitting the rods 21, together with the platen 23 to drop, thereby providing sufficient clearance between the nozzle 36 and the boss 85 to facilitate removal of the sprue.

If desired, timers of the standard type may be used to control energization and de-energization of the solenoid 64.

Means, not shown, are provided for heating molding material in the chamber 31 and the passageway leading therefrom into the injection cylinder 35 to plasticize the molding material for injection in the molds. Any conventional heating means may be used for this purpose.

I claim:

1. In a machine of the character described, a stationary injection plunger, a movable injection cylinder, a hydraulic dash-pot having one portion movable with said cylinder and another portion stationary, a movable ram, a double-acting hydraulic motor for actuating said ram, said ram being adapted to move molds associated with said injection cylinder for causing injection of material therein, a hydraulic fluid reservoir, a pump for supplying hydraulic fluid from said reservoir to said motor, valve means for controlling the direction of flow of fluid to said ram motor, means for continuously supplying fluid from said pump to said dash-pot through said valve means, and means responsive to the dash-pot pressure for automatically venting said dash-pot to said reservoir to limit the pressure in said dash-pot.

2. In a machine of the character described, a stationary injection plunger, a movable injection cylinder, a hydraulic dash-pot having one portion movable with said cylinder and another portion stationary, a movable ram, a double-acting hydraulic motor for actuating said ram, said ram being adapted to move molds associated with said injection cylinder for causing injection of material therein, a hydraulic fluid reservoir, a pump for supplying hydraulic fluid from said reservoir to said motor, valve means for controlling the direction of flow of fluid to said ram motor, means for continuously supplying fluid from said pump to said dash-pot through said valve means, means responsive to the dash-pot pressure for automatically venting said dash-pot to said reservoir to limit the pressure in said dash-pot, and means controlled by the extent of movement of said ram for by-passing oil from said dash-pot to said reservoir.

3. In a molding machine, a hydraulic motor, a four-way valve, conduits connecting opposite ends of said motor to said valve, a hydraulic fluid reservoir, a pump for supplying hydraulic fluid from said reservoir to said valve, means to actuate said valve to reverse flow between said valve and said motor to actuate said motor, a dash-pot having two relatively movable members, conduits providing communication between each end of said hydraulic motor and said dash-pot, a restricted orifice in one conduit, a check valve in the other conduit permitting flow therethrough only toward said dash-pot, a stationary injection plunger, a movable injection cylinder, a ram actuated by said hydraulic motor and adapted to move molds associated with said injection cylinder for causing injection of material therein, means effecting unitary movement of one dash-pot member with said molds, means for maintaining the other dash-pot member stationary, means responsive to the dash-pot pressure for automatically venting said dash-pot to said reservoir to limit the pressure in said dash-pot, and means responsive to the extent of movement of said ram for by-passing hydraulic fluid from said dash-pot to said reservoir.

4. In a machine according to claim 1, means controlled by the extent of movement of said ram for by-passing hydraulic fluid from said dash-pot to said reservoir.

5. In a device of the character described, a reciprocable head, a chamber in said head having two alined passageways communicating therewith and a third communicating passageway oblique to the other two, a stationary plunger extending into one of said two passageways, means for reciprocating said head on said plunger, a chute pivoted at one end and having its other end projecting into said third passageway whereby reciprocation of said head effects oscillation of said chute, and means actuated by movement of said head to deliver a charge of powdered material to said chute upon insertion of said plunger into said chamber.

6. In a device of the character described, a reciprocable head, a chamber in said head having two alined passageways communicating therewith and a third communicating passageway oblique to the other two, a stationary plunger extending into one of said two passageways, means for reciprocating said head on said plunger, a chute pivoted at one end and having its other end projecting into said third passageway whereby reciprocation of said head effects oscillation of said chute, a member having a chamber, an apertured slide reciprocable in said member, a hopper communicating with said chamber, an outlet from said chamber communicating with the pivoted end of said chute, and means for effecting reciprocation of said slide upon reciprocation of said head to deliver a charge of powdered material from said hopper to said chute upon insertion of said plunger into said chamber.

7. In a machine of the character described, a stationary injection plunger, a movable injection cylinder, a hydraulic dash-pot having a stationary cylinder and a piston movable with said injection cylinder, a ram adapted to move molds associated with said injection cylinder for causing injection of material thereinto, a double-acting hydraulic motor for actuating said ram, said hydraulic motor having a pair of end ports and said dash-pot cylinder having a port at one end, a four-way valve having a supply port and a discharge port and two delivery ports, a hydraulic fluid reservoir, a pump connected to said supply port for delivering hydraulic fluid thereto from said reservoir, connections from the first delivery port to one hydraulic motor port and to the port of said dash-pot cylinder, a relief valve in the connection between said first delivery port and said dash-pot cylinder for venting said connection to said reservoir, a restricted orifice between said first delivery port and said relief valve, connections from the second delivery port to the remaining hydraulic motor port and through said relief valve to said first port of said dash-pot cylinder, means preventing reverse flow between said relief valve and said second delivery port, and means controlled by the extent of movement of said ram for by-passing hydraulic fluid from said dash-pot to said reservoir.

8. In a machine of the character described, a stationary injection plunger, a movable injection cylinder, a hydraulic dash-pot having a stationary cylinder and a piston movable with said injection cylinder, a ram adapted to move molds associated with said injection cylinder for causing injection of material thereinto, a double-acting hydraulic motor for actuating said ram, said hydraulic motor having a pair of ports and said dash-pot cylinder having a port at one end, a four-way valve having a supply port and a discharge port and two delivery ports, a hydraulic fluid reservoir, a pump connected to said supply port for delivering hydraulic fluid thereto from said reservoir, connections from the first delivery port to one hydraulic motor port and to said dash-pot cylinder port, a relief valve in the connection between said first delivery port and said dash-pot cylinder for venting said connection to said reservoir, a restricted orifice between said first delivery port and said relief valve, connections from the second delivery port to the remaining hydraulic motor port and through said relief valve to said dash-pot cylinder, means for preventing reverse flow between said relief valve and said second delivery port, a vent to said reservoir in the connection between said relief valve and said dash-pot cylinder port, a valve controlling said vent, and means including said ram for actuating said valve between open and closed positions.

9. In a machine of the character described, a stationary injection plunger, a movable injection cylinder, a hydraulic dash-pot having a stationary cylinder and a piston movable with said injection cylinder, a ram adapted to move molds associated with said injection cylinder for causing injection of material thereinto, a double-acting hydraulic motor for actuating said ram, said hydraulic motor having a pair of ports and said dash-pot cylinder having a port at one end, a four-way valve having a supply port and a discharge port and two delivery ports, a hydraulic fluid reservoir, a pump connected to said supply port for delivering hydraulic fluid thereto from said reservoir, connections from the first delivery port to one hydraulic motor port and to said dash-pot cylinder port, a relief valve in the connection between said first delivery port and said dash-pot cylinder for venting said connection to said reservoir, a restricted orifice between said first delivery port and said relief valve, connections from the second delivery port to the remaining hydraulic motor port and through said relief valve to said dash-pot cylinder, means for preventing reverse flow between said relief valve and said second delivery port, a vent to said reservoir in the connection between said relief valve and said dash-pot cylinder, a biased valve controlling said vent, and means for overcoming the valve bias during a portion of the travel of said ram.

10. In a machine of the character described, a stationary injection plunger, a movable injection cylinder, a hydraulic dash-pot having a stationary cylinder and a piston movable with said injection cylinder, a ram adapted to move molds associated with said injection cylinder for causing injection of material thereinto, a double-acting hydraulic motor for actuating said ram, said hydraulic motor having a pair of ports and said dash-pot cylinder having a port at one end, a four-way valve having a supply port and a discharge port and two delivery ports, a hydraulic fluid reservoir, a pump connected to said supply port for delivering hydraulic fluid thereto from said reservoir, connections from the first delivery port to one hydraulic motor port and to said dash-pot cylinder port, a relief valve in the connection between said first delivery port and said dash-pot cylinder for venting said connection to said reservoir, a restricted orifice between said first delivery port and said relief valve, connections from the second delivery port to the remaining hydraulic motor port and through said relief valve to said dash-pot cylinder, means for preventing reverse flow between said relief valve and said second delivery port, a vent to said reservoir in the connection between said relief valve and said dash-pot cylinder port, a self-closing valve controlling said vent, and means for opening said valve during a portion of the travel of said ram.

11. In a machine of the character described, a stationary injection plunger, a movable injection cylinder, a movable ram, a double-acting hydraulic motor for actuating said ram, said ram being adapted to move molds associated with said injection cylinder for causing injection of material therein by said plunger, a hydraulic fluid reservoir, a pump for supplying hydraulic fluid from said reservoir to said motor, valve means for controlling the direction of flow of fluid to said motor, a pressure motor opposing movement of said cylinder in one direction to provide clamping pressure upon said molds, means for supplying fluid from said pump to said last-named motor through said valve means, and means responsive to the extent of movement of said ram for venting said last-named motor to said reservoir.

12. In a machine of the character described, a stationary injection plunger, a movable injection cylinder, a movable ram, a double-acting hydraulic motor for actuating said ram, said ram being adapted to move molds associated with said injection cylinder for causing injection of material therein by said plunger, a hydraulic fluid reservoir, a pump for supplying hydraulic fluid from said reservoir to said motor, valve means for controlling the direction of flow of fluid to said motor, a pressure motor opposing movement of said cylinder in one direction to provide clamping pressure upon said molds, means for supplying fluid from said pump to said last-named motor through said valve means, means responsive to the extent of movement of said ram for venting said last-named motor, and means responsive to the pressure in said last-named motor for venting said last-named motor to said reservoir to limit the pressure in said last-named motor.

13. In a machine of the character described, a stationary injection plunger, a movable injection cylinder, a movable ram, a double-acting hydraulic motor for actuating said ram, said ram being adapted to move molds associated with said injection cylinder for causing injection of material therein by said plunger, a hydraulic fluid reservoir, a pump for supplying hydraulic fluid from said reservoir to said motor, valve means for controlling the direction of flow of fluid to said motor, a pressure motor opposing movement of said cylinder in one direction to provide clamping pressure upon said molds, means for supplying fluid through said valve means to said last-named motor and including a relief valve for venting said last-named motor to said reservoir, a vent for said last-named motor to said reservoir, and means for closing said vent during a portion of the travel of said ram.

14. In a machine of the character described, a stationary injection plunger, a movable injection cylinder, a movable ram, a double-acting hydraulic motor for actuating said ram, said ram being adapted to move molds associated with said injection cylinder for causing injection of material therein by said plunger, a hydraulic fluid reservoir, a pump for supplying hydraulic fluid from said reservoir to said motor, valve means for controlling the direction of flow of fluid to said motor, a pressure motor opposing movement of said cylinder in one direction to provide clamping pressure upon said molds, means for supplying fluid through said valve means to said last-named motor and including a relief valve venting to said reservoir, a vent to said reservoir between said relief valve and said last-named motor, a biased valve controlling said vent, and means for overcoming the valve bias during a portion of the travel of said ram.

15. In a device of the character described, a vertically reciprocable head, a vertical passageway in said head, a vertical stationary plunger extending into said passageway, means for reciprocating said head and said plunger between a low and a high position, a chute pivoted at one end for oscillation about a horizontal axis, a second passageway in said head communicating with said first passageway and receiving the free end of said chute whereby reciprocation of said head effects oscillation of said chute between an inclined position and a substantially horizontal position, the lower end of said plunger lying above the inner end of said second passage in the low position of said head and below the inner end of said passage in the high position of said head, and means actuated by the movement of said head to deliver a charge of powdered material to said chute upon elevation of said head from its low position to its high position.

16. In a device of the character described, a vertically reciprocable head, a vertical passageway in said head, a vertical stationary plunger extending into said passageway, means for reciprocating said head and said plunger between a low and a high position, a chute pivoted at one end for oscillation about a horizontal axis, a second passageway in said head communicating with said first passageway and receiving the free end of said chute whereby reciprocation of said head effects oscillation of said chute between an inclined position and a substantially horizontal position, the lower end of said plunger lying above the inner end of said second passage in the low position of said head and below the inner end of said passage in the high position of said head, a member having a chamber, an apertured slide reciprocable in said chamber, a hopper communicating with said chamber, an outlet from said chamber communicating with the pivoted end of said chute, and means for effecting reciprocation of said slide upon reciprocation of said head to deliver a charge of powdered material from said hopper to said chute when said head is moved from its low position to its high position.

RICHARD W. DINZL.

REFERENCES CITED

The following references are of record in the file of this patent:

UNITED STATES PATENTS

| Number | Name | Date |
|---|---|---|
| 1,993,942 | Novotny | Mar. 12, 1935 |
| 2,351,454 | Pereles | June 13, 1944 |
| 2,262,615 | Lester | Nov. 11, 1941 |
| 2,327,227 | Tucker | Aug. 17, 1943 |
| 2,333,601 | Tucker | Nov. 2, 1943 |
| 2,067,265 | Ernst | Jan. 12, 1937 |
| 840,877 | Steedman | Jan. 8, 1907 |

FOREIGN PATENTS

| Number | Country | Date |
|---|---|---|
| 489,944 | Great Britain | Aug. 3, 1938 |